United States Patent
Wang et al.

(10) Patent No.: US 11,063,721 B2
(45) Date of Patent: Jul. 13, 2021

(54) METHOD AND APPARATUS FOR SENDING PILOT, AND METHOD AND APPARATUS FOR RECEIVING PILOT

(71) Applicant: DATANG MOBILE COMMUNICATIONS EQUIPMENT CO., LTD., Beijing (CN)

(72) Inventors: Donghao Wang, Beijing (CN); Jinxi Su, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/608,201

(22) PCT Filed: Jan. 23, 2018

(86) PCT No.: PCT/CN2018/073804
§ 371 (c)(1),
(2) Date: Oct. 25, 2019

(87) PCT Pub. No.: WO2018/196449
PCT Pub. Date: Nov. 1, 2018

(65) Prior Publication Data
US 2020/0195400 A1  Jun. 18, 2020

(30) Foreign Application Priority Data
Apr. 25, 2017 (CN) .......................... 201710278122.0

(51) Int. Cl.
*H04L 5/00* (2006.01)
*H04L 25/02* (2006.01)
*H04W 72/04* (2009.01)
*H04B 3/10* (2006.01)
(Continued)

(52) U.S. Cl.
CPC ............. *H04L 5/0048* (2013.01); *H04B 3/10* (2013.01); *H04L 5/0005* (2013.01);
(Continued)

(58) Field of Classification Search
CPC . H04L 5/0057; H04L 5/0048; H04L 41/0896; H04B 7/0632; H04B 3/10; H04W 28/0908
See application file for complete search history.

(56) References Cited

U.S. PATENT DOCUMENTS

2007/0070944 A1* 3/2007 Rinne ................. H04B 7/0669
370/329
2014/0140422 A1* 5/2014 Li ......................... H04L 5/0007
375/260
(Continued)

FOREIGN PATENT DOCUMENTS

| CN | 101299871 A | 11/2008 |
|---|---|---|
| CN | 101313548 A | 11/2008 |

(Continued)

OTHER PUBLICATIONS

InterDigital Communications: "Considerations on demodulation RS design for NR", 3GPP TSG RAN WG1 Meeting #87, R1-1612638, Reno, USA, Nov. 14-18, 2016.
(Continued)

*Primary Examiner* — Salvador E Rivas
(74) *Attorney, Agent, or Firm* — Kilpatrick Townsend & Stockton, LLP

(57) ABSTRACT

Disclosed in the present application are a pilot sending and receiving method and device, configured to reduce a delay of receiving pilot data at a terminal, thus improving efficiency of channel estimation based on the pilot data. The pilot sending method provided in the present application comprises: determining a pilot data pattern configured for a user equipment device, the pilot data pattern comprising time-frequency position information of pilot data, and the time-frequency position information comprising position information of an initial time point of the pilot data in a (Continued)

Determine a pilot pattern configured for a user equipment, where the pilot pattern includes time-frequency position information of A pilot, and the time-frequency position information of the pilot includes position information of an initial time point of the pilot in sub-frames — S101

Send the pilot to the user equipment according to the pilot pattern — S102 subframe; and sending to the user equipment device, according to the pilot data pattern, the pilot data.

10 Claims, 8 Drawing Sheets

(51) Int. Cl.
  *H04W 28/08* (2009.01)
  *H04L 12/24* (2006.01)
(52) U.S. Cl.
  CPC ........ *H04L 5/0094* (2013.01); *H04L 25/0226* (2013.01); *H04W 72/0446* (2013.01); *H04L 41/0896* (2013.01); *H04W 28/0908* (2020.05)

(56) References Cited

U.S. PATENT DOCUMENTS

| | | | |
|---|---|---|---|
| 2015/0055725 A1* | 2/2015 | Yu | H04L 27/26 375/267 |
| 2016/0352481 A1 | 12/2016 | Jiang et al. | |
| 2016/0359600 A1* | 12/2016 | Krzymien | H04L 1/0023 |
| 2017/0187504 A1* | 6/2017 | Qian | H04L 5/0073 |

FOREIGN PATENT DOCUMENTS

| | | |
|---|---|---|
| CN | 101540751 A | 9/2009 |
| CN | 101778067 A | 7/2010 |
| CN | 102916920 A | 2/2013 |
| CN | 104125184 A | 10/2014 |
| WO | 2016191431 A3 | 12/2016 |

OTHER PUBLICATIONS

Xinwei: "Discussion on DMRS Design and Evaluation Results"; 3GFP TSG-RAN WG1 #88b; R1-1704665; Spokane, US, Apr. 3-7, 2017.

* cited by examiner

-- Prior Art --

METHOD AND APPARATUS FOR SENDING PILOT, AND METHOD AND APPARATUS FOR RECEIVING PILOT

This application is a National Stage of International Application No. PCT/CN2018/073804, filed on Jan. 23, 2018, which claims the priority of Chinese Patent Application No. 201710278122.0, filed with the Chinese Patent Office on Apr. 25, 2017, and entitled "A method and apparatus for sending a pilot, and a method and apparatus for receiving a pilot", both of which are hereby incorporated by reference in their entireties.

FIELD

The present disclosure relates to the field of communications, and particularly to a method and apparatus for sending a pilot, and a method and apparatus for receiving a pilot.

BACKGROUND

As the fourth generation of mobile communication technologies is being commercialized at a large scale, and the mobile services are growing constantly, studies have been made on the fifth generation (5G) of communication technologies all over the world. The 5G communication involves a number of technologies, and a variety of demand for data and connectivity services can be satisfied as the technologies are changing and innovating. The Study Item (SI) about standardization of a new 5G air interface has been established in the $71^{st}$ RAN session of the 3GPP. The study on the new air interface has been generally made in the following aspects according to the categories of vertical scenarios in the 5G communication: enhanced Mobile Broad Band (eMBB), Ultra-Reliable Low-Latency Communication (URLLC), and massive Machine Type Communication (mMTC).

In the several application scenarios above, channel encoding, a new multi-access mode, a multi-antenna mode, a new parameter set frame structure, etc., have been discussed in the 3GPP. In the URLLC scenario, there are a number of differences of its service attributes from the legacy data services, so a pertinent study applicable to this scenario shall be made. In order to satisfy the KPI index (a 1 ms delay in uni-directional transmission, and 99.999% transmission reliability) in the URLLC scenario, a study on a new frame structure is important, and a pilot design is important in a design of the new frame structure.

In an LTE system, channel state information is generally obtained by inserting a number of Reference Signals (RS's) in the time and frequency domains so that a receiver obtains a channel response in the frequency domain by executing estimation and interpolation algorithms on channels in the frequency domain at the positions of the reference signals, where different antenna ports correspond to different reference signals, and their spacing depends upon delays and Doppler spread characteristics of the different channels, so there is a high density of each reference signal in the time and frequency domains. FIG. 1 illustrates a pilot pattern with two antenna ports, where R0 represents a pilot symbol of an antenna port 0, and R1 represents a pilot symbol of an antenna port 1; and 1 represents a symbol index in a timeslot, i.e., a symbol index in the time domain, and k represents an index in the frequency domain. As illustrated in FIG. 1, each row represents symbols in a sub-frame; and for example, each sub-frame includes two timeslots, and each timeslot includes seven symbols, that is, each sub-frame includes 14 symbols.

In the pilot pattern as illustrated in FIG. 1, in order to obtain a channel response in the frequency domain throughout the sub-frame, a user equipment firstly obtains data of all the pilot symbols, and there is a significant delay in reception; and if a short delay is required for a service in the URLLC scenario, then the pilot design above may not satisfy the delay required of the service. On the other hand, as can be apparent from FIG. 1, when the number of antenna ports is two, there is a pilot overhead (i.e., the number of Resource Elements (REs) occupied by the pilot symbols) of more than 7%, and as the number of antenna ports is increasing, the pilot overhead will be increasing, thus degrading the utilization ratio of an available spectrum in the system.

SUMMARY

Embodiments of the disclosure provide a method and apparatus for sending a pilot, and a method and apparatus for receiving a pilot so as to shorten a delay in receiving the pilot by a user equipment to thereby improve the efficiency of estimating a channel based upon the pilot.

An embodiment of the disclosure provides a method for sending a pilot, the method including:
  determining a pilot pattern configured for a user equipment, and the pilot pattern includes time-frequency position information of the pilot, and the time-frequency position information of the pilot includes position information of an initial time point of the pilot in sub-frames; and
  sending the pilot to the user equipment according to the pilot pattern.

With this method according to the embodiment of the disclosure, the user equipment can obtain the pilots throughout each sub-frame as early as possible using the prepositive pilots (the pilot at the initial time point in the sub-frame) directly instead of waiting until pilots at subsequent time points after the initial time point in the sub-frame are received, to thereby shorten a delay in receiving the pilots, and perform channel estimation using these pilots to thereby shorten a delay in channel estimation.

In one embodiment, the time-frequency position information of the pilot includes the position information of the initial time point of the pilot in each of the sub-frames.

In one embodiment, the initial time point in each of the sub-frames is the first symbol of each of the sub-frames.

In one embodiment, the method further includes:
  updating the pilot pattern of the user equipment so that the time-frequency position information of the pilot in the updated pilot pattern includes position information of the initial time point of the pilot in the sub-frames, and position information of subsequent time points after the initial time point; and
  sending the pilot to the user equipment according to the updated pilot pattern.

In one embodiment, after the pilot pattern is updated for the user equipment, and before the pilot is sent to the user equipment according to the updated pilot pattern, the method further includes:
  sending control information to the user equipment to instruct the user equipment to receive the pilot.

In one embodiment, the control information includes indication information of the updated pilot pattern.

In one embodiment, updating the pilot pattern for the user equipment includes: updating the pilot pattern for the user equipment according to a coherence period of time and a coherence bandwidth of a user channel.

An embodiment of the disclosure provides a method for receiving a pilot, the method including:

receiving a pilot at an initial time point in a sub-frame; and determining channel estimation of the sub-frame using the pilot.

In one embodiment the method further includes:

receiving control information to instruct the user equipment to receive the pilot; and receiving the pilot at the initial time point and subsequent time points after the initial time points in the sub-frame according to the control information.

An embodiment of the disclosure provides an apparatus for sending a pilot, the method including:

a first device configured to determine a pilot pattern configured for a user equipment, and the pilot pattern includes time-frequency position information of the pilot, and the time-frequency position information of the pilot includes position information of an initial time point of the pilot in sub-frames; and a second device configured to send the pilot to the user equipment according to the pilot pattern.

In one embodiment, the time-frequency position information of the pilot includes the position information of the initial time point of the pilot in each of the sub-frames.

In one embodiment, the initial time point in each of the sub-frames is the first symbol of each of the sub-frames.

In one embodiment, the first device is further configured: to update the pilot pattern of the user equipment so that the time-frequency position information of the pilot in the updated pilot pattern includes position information of the initial time point of the pilot in the sub-frames, and position information of subsequent time points after the initial time point; and the second device is further configured to send the pilot to the user equipment according to the updated pilot pattern.

In one embodiment, the second device is further configured, after the first device updates the pilot pattern for the user equipment, and before the pilot is sent to the user equipment in the updated pilot pattern, to send control information to the user equipment to instruct the user equipment to receive the pilot.

In one embodiment, the control information includes indication information of the updated pilot pattern.

In one embodiment, the first device is configured to update the pilot pattern for the user equipment according to a coherence period of time and a coherence bandwidth of a user channel.

An embodiment of the disclosure provides an apparatus for receiving a pilot, the apparatus including:

a receiving device configured to receive a pilot at an initial time point in a sub-frame; and a processing device configured to determine channel estimation of the sub-frame using the pilot.

In one embodiment, the receiving device is further configured:

to receive control information to instruct the user equipment to receive pilot; and to receive the pilot at the initial time point and subsequent time points after the initial time points in the sub-frame according to the control information.

BRIEF DESCRIPTION OF THE DRAWINGS

Embodiments of this disclosure are described in the drawings.

DETAILED DESCRIPTION OF THE EMBODIMENTS

The embodiments of the disclosure provide a method and apparatus for sending a pilot, and a method and apparatus for receiving a pilot so as to shorten a delay in receiving the pilot by a user equipment to thereby improve the efficiency of estimating a channel based upon the pilot.

Figures 1, 2:
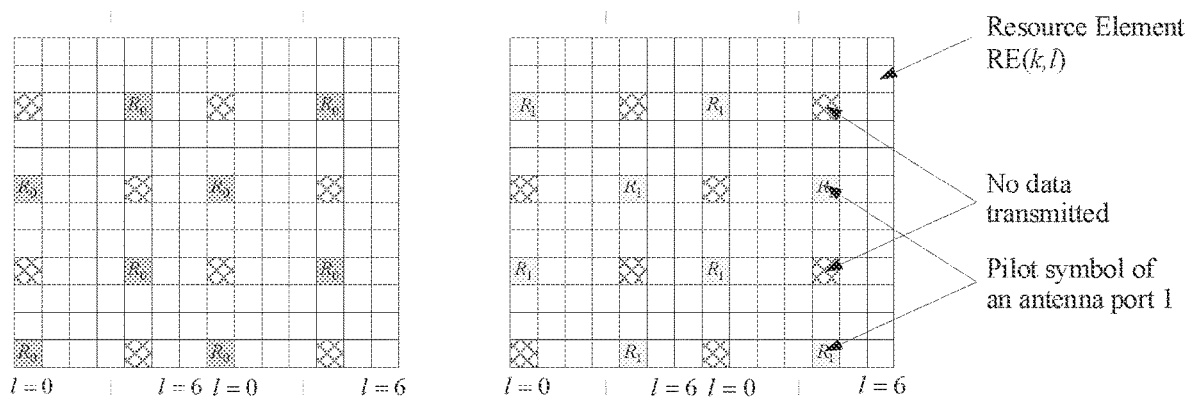
FIG. 1 is a schematic diagram of a pilot pattern in the prior art.
FIG. 2 is a schematic flow chart of a method for sending a pilot according to an embodiment of the disclosure.

As illustrated in FIG. 2, a method for sending a pilot according to an embodiment of the disclosure at the network side, e.g., the base station side, includes the following steps.

The step S101 is to determine a pilot pattern configured for a user equipment, where the pilot pattern includes time-frequency position information of pilots, and the time-frequency position information of the pilots includes position information of an initial time point of the pilots in sub-frames.

In the embodiment of the disclosure, fixed prepositive pilots can be arranged at a high density, that is, there is small spacing between adjacent pilot signals in the frequency domain, and for example, they are spaced by one or two REs, or pilots can be arranged in all the REs in the first symbols of the respective sub-frames. When there is a small length of a sub-frame (e.g. a sub-frame includes only five or seven symbols), a receiver (the user equipment) can obtain channel estimation throughout the sub-frame as early as possible using the prepositive pilots directly to thereby shorten a delay in reception, and improve the efficiency of channel estimation.

The prepositive pilots are arranged as pilots of REs corresponding to the first symbols of the sub-frames.

Figure 3:
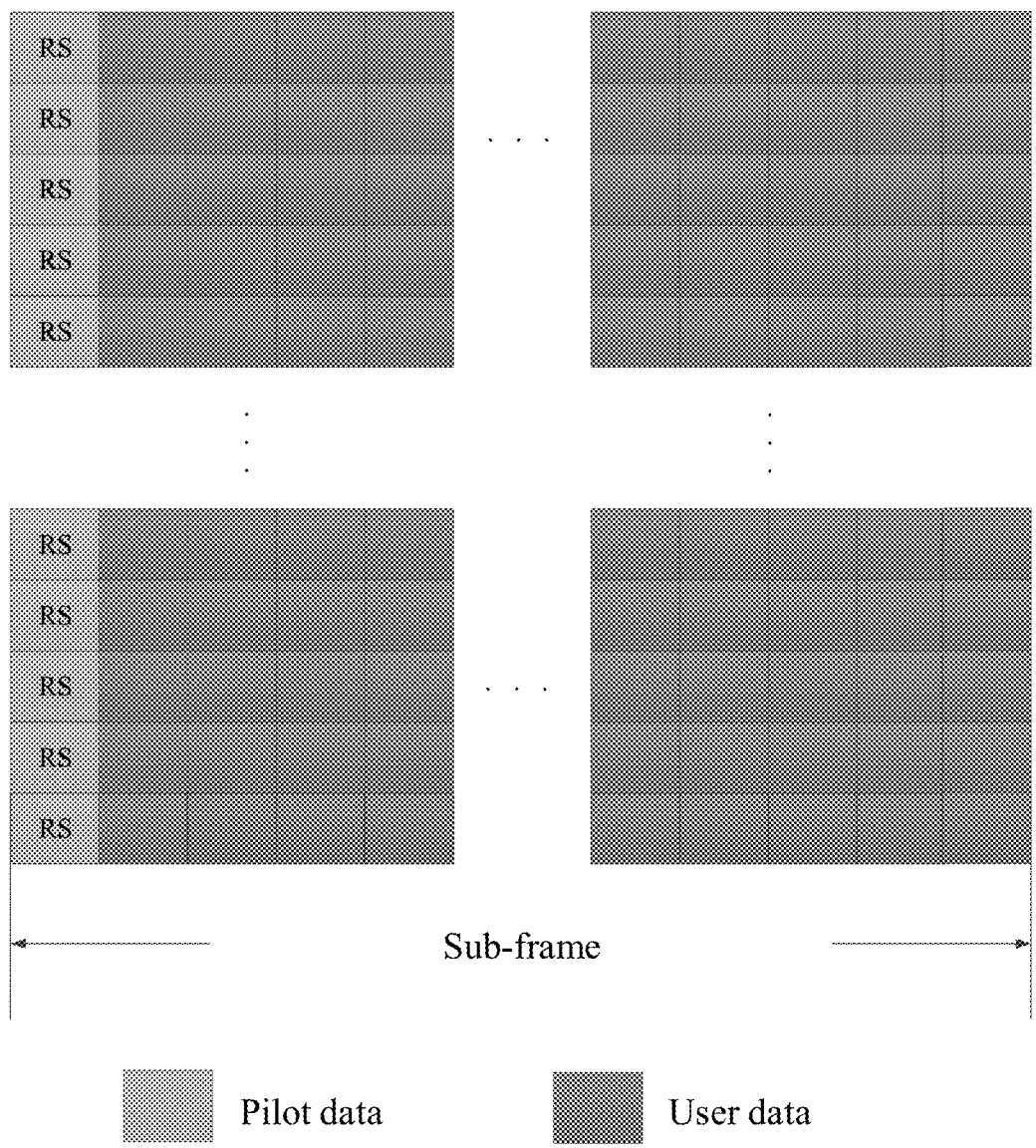
FIG. 3 is a schematic diagram of a pilot pattern including prepositive pilots according to an embodiment of the disclosure.

FIG. 3 illustrates a pilot pattern when pilots are arranged in all the REs in the first symbols of the respective sub-frames, for example.

The step S102 is to send the pilots to the user equipment according to the pilot pattern.

In the method above according to the embodiment of the disclosure, the user equipment can obtain the pilots throughout each sub-frame as early as possible using the prepositive pilots (the pilot at the initial time point in the sub-frame) directly instead of waiting until pilots at subsequent time point to the initial time point in the sub-frame are received, to thereby shorten a delay in receiving the pilots, and perform channel estimation using these pilots to thereby shorten a delay in channel estimation.

In one embodiment, the time-frequency position information of the pilots includes the position information of the initial time point of the pilots in the respective sub-frames.

In one embodiment, the initial time point in each sub-frame is particularly the first symbol of each sub-frame.

In one embodiment, the method further includes:

updating the pilot pattern of the user equipment so that the time-frequency position information of the pilots in the updated pilot pattern includes position information of the initial time point of the pilots in the sub-frames, and subsequent time points to the initial time point; and sending the pilots to the user equipment in the updated pilot pattern.

Stated otherwise, after the prepositive pilots are configured, the user equipment can be further configured with pilots at adjustable densities and positions in the preamble pattern, and as opposed to the prepositive pilots, these pilots at the adjustable densities and positions in the preamble pattern can be referred to as dynamic pilots. The time and frequency densities thereof depend upon a coherence period of time and a coherence bandwidth of a user channel, and the base station can decide whether to issue the dynamic pilots, and determine a particular pilot pattern to be issued, according to a type of data (e.g., URLLC, eMBB, etc.), and a length of symbol occupied by the data.

In one embodiment, after the pilot pattern is updated for the user equipment, and before the pilots are sent to the user equipment in the updated pilot pattern, the method further includes:

sending control information to the user equipment to instruct the user equipment to receive the pilots.

In one embodiment, the control information includes indication information of the updated pilot pattern.

In one embodiment, updating the pilot pattern for the user equipment includes: updating the pilot pattern for the user equipment according to a coherence period of time and a coherence bandwidth of a user channel.

Embodiment of the disclosure can be applicable to different applications with different demands for channel estimation, and thus highly flexible.

For example, firstly, a fixed prepositive pilot signal in one symbol is arranged at an initial time point in each sub-frame as illustrated in FIG. 3. The prepositive pilot can be configured statically, that is, the positions of time and frequency resources occupied by the prepositive pilot can be determined when a cell is set up. However there is a high density (the highest density throughout a bandwidth as illustrated in FIG. 3) of the prepositive pilot in the frequency domain so that accurate and real-time channel estimation in the frequency domain can be guaranteed.

Figure 4:
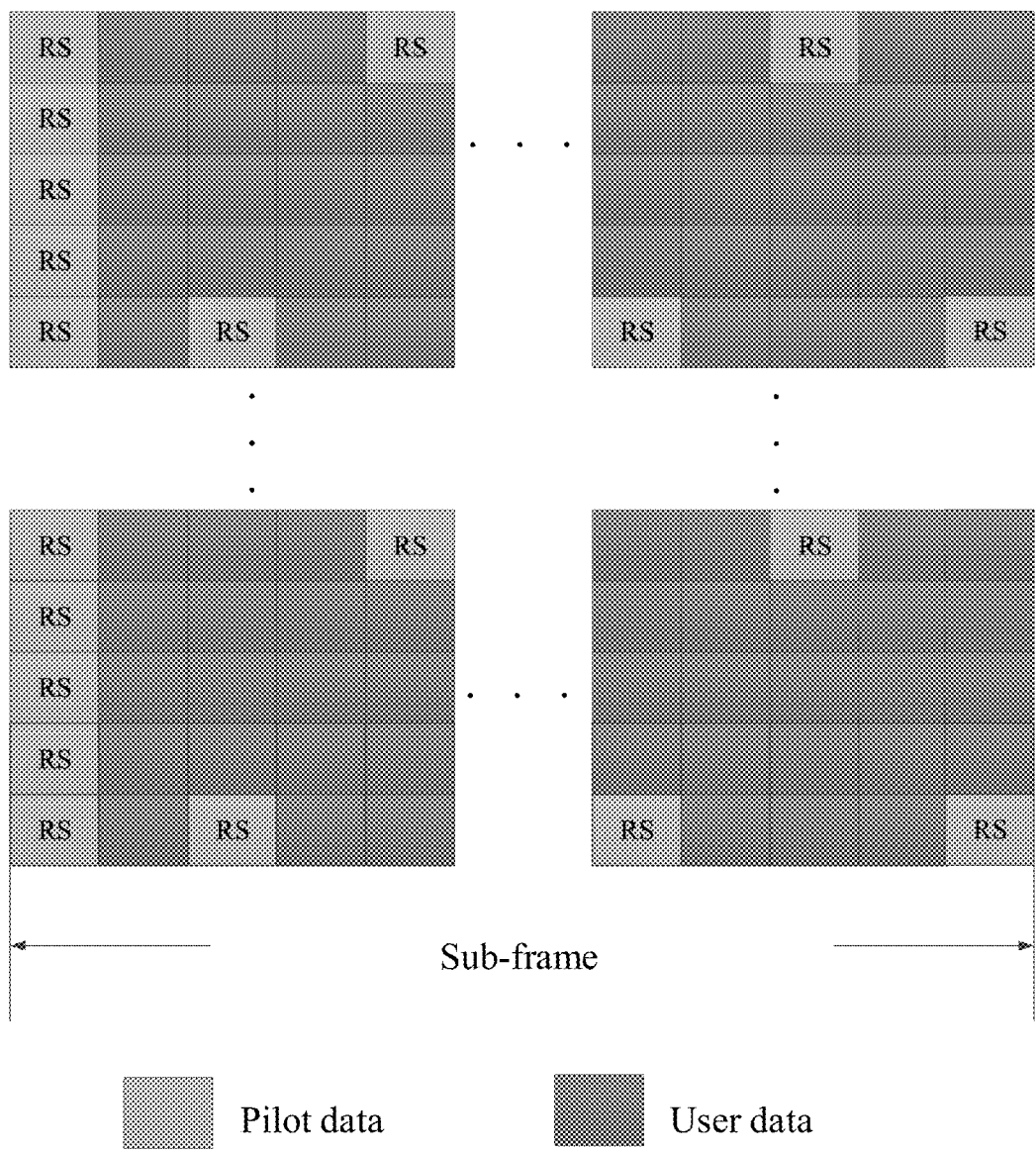
FIG. 4 is a schematic diagram of a pilot pattern including dynamic pilots according to an embodiment of the disclosure.
Figure 5:
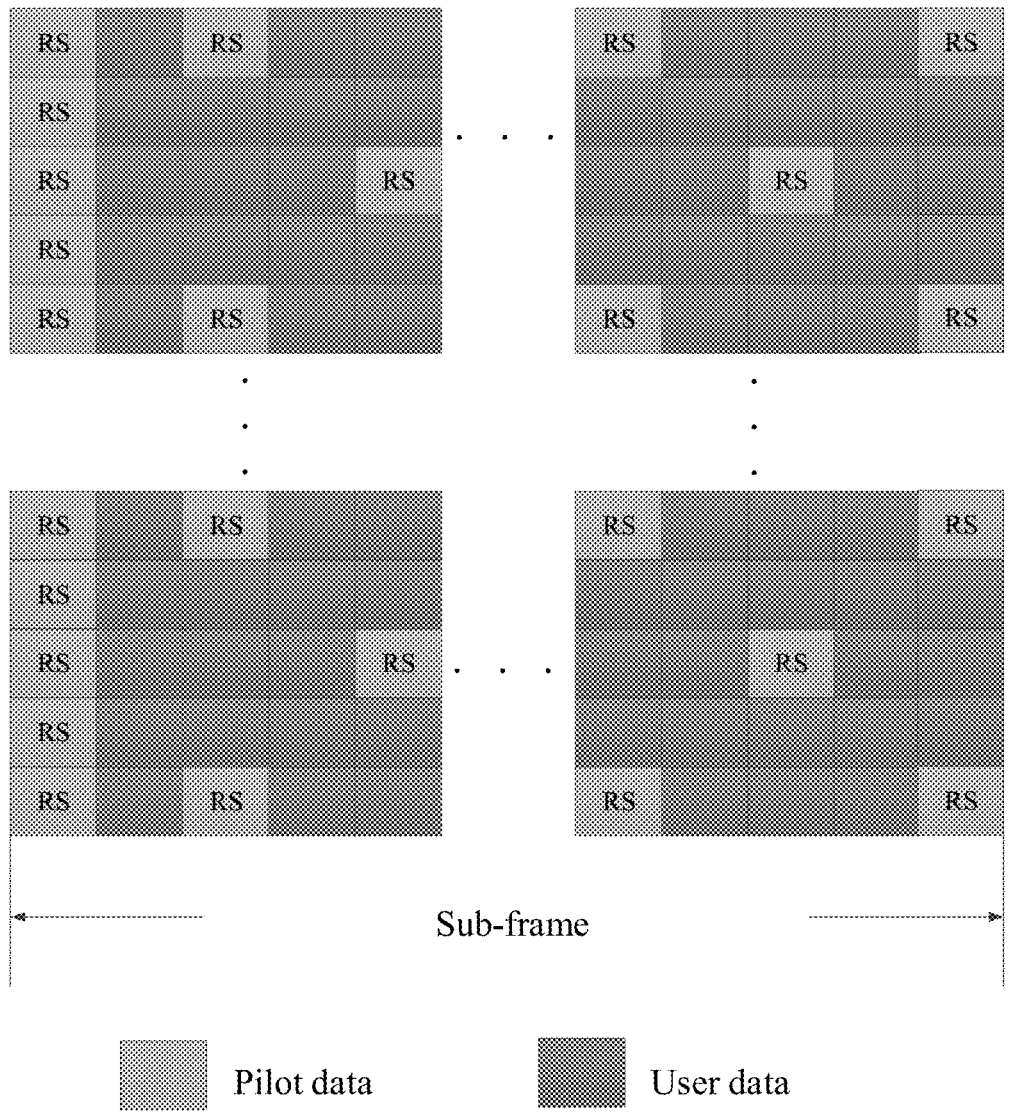
FIG. 5 is a schematic diagram of another pilot pattern including dynamic pilots according to an embodiment of the disclosure.

Furthermore, the base station issues control information in a control symbol region after the position of the symbol including the prepositive pilot, in a start sub-frame in each configuration periodicity of the pilot preamble. The control information includes a pilot pattern indication field indicating a pilot pattern for subsequent data symbols. Different indication fields represent different combinations of a pilot overhead, a pilot sequence, and pilot positions as depicted in Table 1. When a sub-frame includes a small number of symbols (e.g., a sub-frame includes only five or seven symbols), the base station configures no dynamic pilots, and the user equipment obtains channel estimation throughout the sub-frame by extending an estimation result of the prepositive pilot, that is, the user equipment duplicates the channel estimation result of the prepositive pilot into all the symbols throughout the sub-frame to thereby speed up reception of the pilots. For services with different reliability demands, the base station configures different pilot patterns according to different channel conditions (a coherence period of time, and a coherence bandwidth) of the user equipment: when there are a long channel coherence period of time, and a broad channel coherence bandwidth, a sparse pilot pattern is configured; and when there are a short channel coherence period of time, and a narrow channel coherence bandwidth, a dense pilot pattern is configured. The user equipment is provided with different estimation performance dependent upon different pilot overheads to thereby satisfy a reliability index. As illustrated in FIG. 4 and FIG. 5, there are a low density and a small overhead of dynamic pilots in FIG. 4, and they are applicable to a service scenario in which a channel changes slowly or high reliability is not required; and there is a high density of dynamic pilots in FIG. 5, and they are applicable to a service scenario in which a channel changes quickly or high reliability is required.

Table 1 is a pilot pattern indication table

| Pilot pattern field value | Pilot pattern to be updated or not | Dynamic pilots | Pilot sequence | Pilot pattern |
|---|---|---|---|---|
| 0 | No | / | / | / |
| 1 | Yes | None | / | / |
| 2 | Yes | Available | Sequence 1 | Pattern 1 |
| 3 | Yes | Available | Sequence 2 | Pattern 2 |
| 4 | Yes | Available | Sequence 3 | Pattern 3 |
| ... | | ... | ... | ... |

It shall be noted that in the embodiment of the disclosure, a particular pilot sequence and a particular pilot pattern can be prescribed, and the control information can only include the number of the pilot pattern, and the number of the pilot pattern as depicted in Table 1 to thereby save an overhead of the control information; or the control information can only include the pilot pattern field value as depicted in Table, and the correspondence relationship table as depicted in Table 1 is stored in advance in the user equipment and the base station, so the UE can determine the currently updated pilot pattern, the pilot sequence for the dynamic pilots, etc., according to the pilot pattern field value.

The base station configures the sub-frame with the same pilot pattern as in the pilot patter indication field, and the user equipment parses the control information for the pilot pattern and the pilot sequence of the sub-frame, receives the data, and performs channel estimation.

In the next configuration periodicity of the pilot pattern (the periodicity can be configured statically, or can vary anytime, that is, can be configured dynamically), and the base station can decide whether to update the dynamic pilot pattern, according to the channel condition, and the type of user data to be scheduled, and indicate it to the user equipment in the control information.

Embodiment of the disclosure, the configuration periodicity of the pilot pattern is flexibly variable, that is, the base station can set different configuration periodicities as needed, e.g., 80 ms, 160 ms, 320 ms, etc., where the shortest periodicity is a slot per sub-frame.

Figure 6:
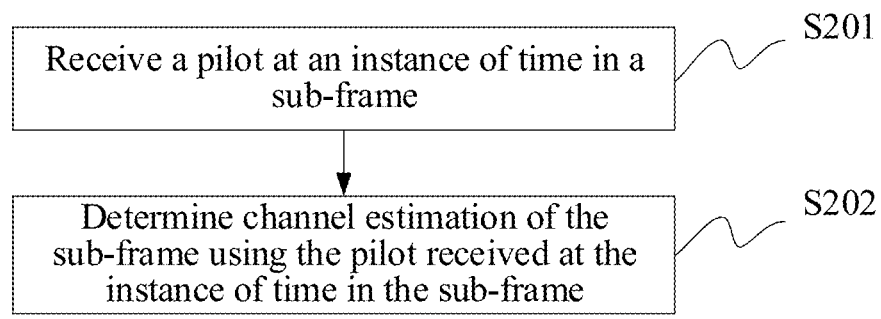
FIG. 6 is a schematic flow chart of a method for receiving a pilot according to an embodiment of the disclosure.

In correspondence to the method above for sending a pilot at the base station side, FIG. 6 illustrates a method for receiving a pilot at the user equipment side according to an embodiment of the disclosure, where the method includes the following steps:

the step S201 is to receive a pilot at an initial time point in a sub-frame; and the step S202 is to determine channel estimation of the sub-frame using the pilot received at the initial time point in the sub-frame.

In one embodiment, the step S202 includes: performing channel estimation on the initial time point using the pilot received at the initial time point in the sub-frame, and determines channel estimation on the other time points in the sub-frame using a result of channel estimation on the initial time point, e.g., through duplication.

In one embodiment, the method further includes:

receiving control information to instruct the user equipment to receive pilots; and receiving the pilots at the initial time point and its subsequent time points in the sub-frame according to the control information.

The control information is the information as depicted in Table 1, and when the base station updates a pilot pattern, it sends the control information to instruct the user equipment to receive the pilots in the new pilot pattern.

Two particular embodiments will be described below.

First Embodiment

Prepositive pilots are configured statically when a cell is set up, as illustrated in FIG. 3.

Figure 7:
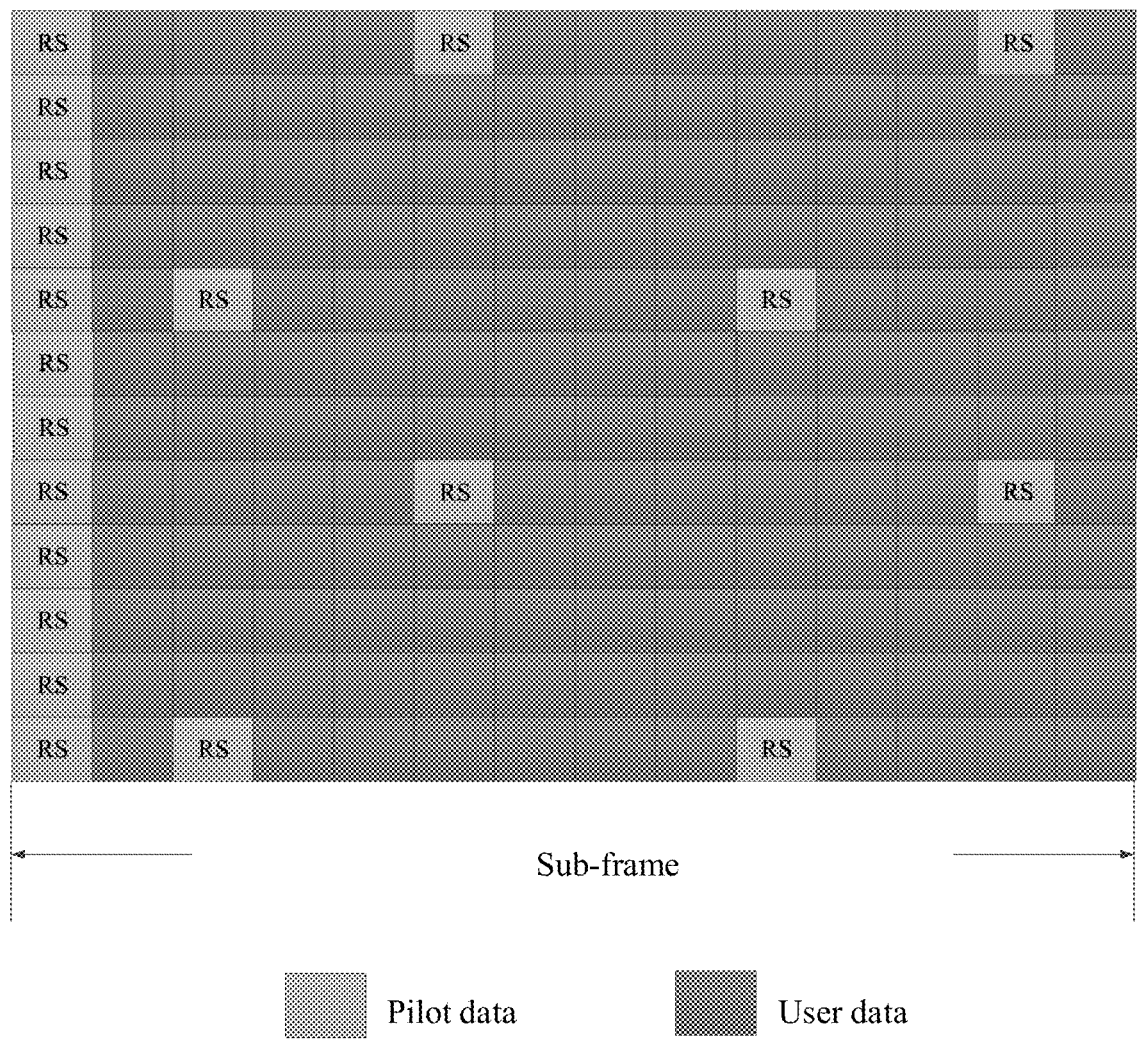
FIG. 7 is a schematic diagram of a pilot pattern according to a first embodiment of the disclosure.

In a sub-frame n, a base station schedules a user equipment 1, allocates downlink time and frequency resources for the user equipment 1, configures dynamic pilots in a pilot pattern as illustrated in FIG. 7 according to a channel condition and a service type of the user equipment 1, and issues information about the dynamic pilots (including indication information of the positions of the pilots, a pilot sequence, etc.) to the user equipment side in downlink control information. In this embodiment, the user equipment accesses an eMBB service, and there is a slowly changing channel thereof, for example, so a sparse dynamic pilot pattern is applied thereto, that is, there is such a low density of the dynamic pilots that there are only two dynamic pilots after a prepositive pilot in a sub-frame, and the dynamic pilots may not be arranged in every sub-frame, but may be arranged at every other sub-frames.

Upon reception of downlink data, the user equipment firstly parses the control information, determines the pilot pattern in the current sub-frame according to the control information, and then performs channel estimation at the positions of the pilots in the pilot pattern, and performs interpolation with the prepositive pilot to obtain a channel estimation result throughout the sub-frame.

Second Embodiment

Prepositive pilots are configured statically when a cell is set up, as illustrated in FIG. 3.

Figure 8:
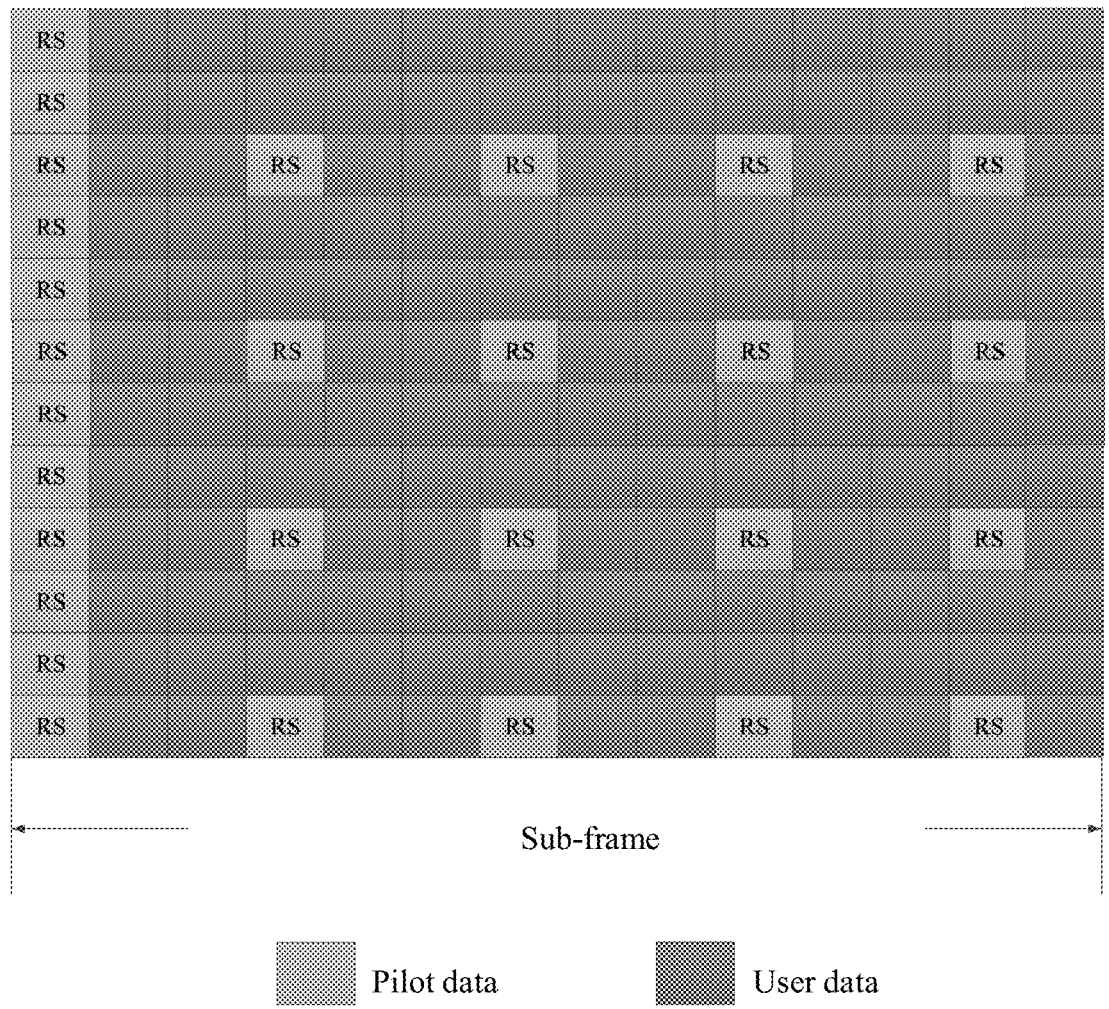
FIG. 8 is a schematic diagram of a pilot pattern according to a second embodiment of the disclosure.

In a sub-frame n, a base station schedules a user equipment 1, allocates downlink time and frequency resources for the user equipment 1, configures dynamic pilots as illustrated in FIG. 8 according to a channel condition and a service type of the user equipment 1, and issues information about the dynamic pilots to the user equipment side in downlink control information. In this embodiment, the user equipment accesses a URLLC service, and has no demand for high reliability, so a dense dynamic pilot pattern is applied thereto; and as illustrated in FIG. 8, there are four dynamic pilots after a prepositive pilot in a sub-frame, and four dynamic pilots are arranged in every other two sub-frames, so there is a higher density of the dynamic pilots than in the pilot pattern as illustrated in FIG. 7, and thus the user equipment can obtain more pilots, and perform channel estimation more accurately and reliably.

Upon reception of downlink data, the user equipment firstly parses the control information, determines the pilot pattern in the current sub-frame according to the control information, and then performs channel estimation at the positions of the dynamic pilots in the pilot pattern, and performs interpolation with the prepositive pilot to obtain a channel estimation result throughout the sub-frame.

Apparatuses according to the embodiments of the disclosure will be described below.

Figure 9:
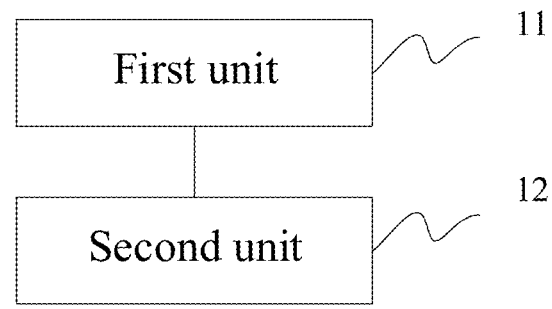
FIG. 9 is a schematic structural diagram of an apparatus for sending a pilot according to an embodiment of the disclosure.

As illustrated in FIG. 9, an apparatus for sending a pilot at the base station side according to an embodiment of the disclosure includes:

a first device 11 is configured to determine a pilot pattern configured for a user equipment, where the pilot pattern includes time-frequency position information of pilots, and the time-frequency position information of the pilots includes position information of an initial time point of the pilots in sub-frames; and a second device 12 is configured to send the pilots to the user equipment according to the pilot pattern.

In one embodiment, the time-frequency position information of the pilots particularly includes the position information of the initial time point of the pilots in the respective sub-frames.

In one embodiment, the initial time point in each sub-frame is particularly the first symbol of each sub-frame.

In one embodiment, the first device is further configured: to update the pilot pattern of the user equipment so that the time-frequency position information of the pilots in the updated pilot pattern includes position information of the initial time point of the pilots in the sub-frames, and subsequent time points to the initial time point; and the second device is further configured to send the pilots to the user equipment in the updated pilot pattern.

In one embodiment, the second device is further configured, after the first device updates the pilot pattern for the user equipment, and before the pilots are sent to the user equipment in the updated pilot pattern, to send control information to the user equipment to instruct the user equipment to receive the pilots.

In one embodiment, the control information includes indication information of the updated pilot pattern.

In one embodiment, the first device is configured to update the pilot pattern for the user equipment according to a coherence period of time and a coherence bandwidth of a user channel.

Figure 10:
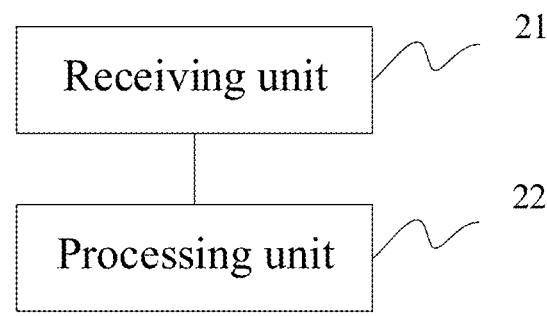
FIG. 10 is a schematic structural diagram of an apparatus for receiving a pilot according to an embodiment of the disclosure.

As illustrated in FIG. 10, an embodiment of the disclosure provides an apparatus for receiving a pilot at the user equipment side, where the apparatus includes:

a receiving device 21 is configured to receive a pilot at an initial time point in a sub-frame; and a processing device 22 is configured to determine channel estimation of the sub-frame using the pilot.

In one embodiment, the receiving device is further configured:

to receive control information to instruct the user equipment to receive pilots; and to receive the pilots at the initial time point and its subsequent time points in the sub-frame according to the control information.

Figure 11:
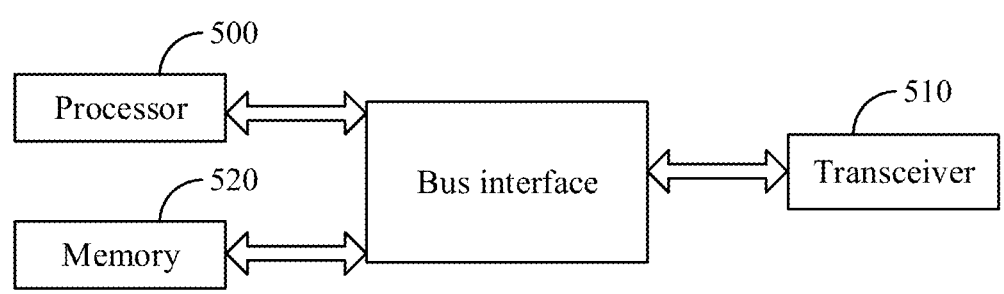
FIG. 11 is a schematic structural diagram of another apparatus for sending a pilot according to an embodiment of the disclosure.

As illustrated in FIG. 11, another apparatus for sending a pilot at the base station side according to an embodiment of the disclosure includes: a processor 500 configured to read and execute program in a memory 520:

to determine a pilot pattern configured for a user equipment, where the pilot pattern includes time-frequency position information of pilots, and the time-frequency position information of the pilots includes position information of an initial time point of the pilots in sub-frames; and to send the pilots to the user equipment in the pilot pattern through a transceiver 510.

In one embodiment, the time-frequency position information of the pilots particularly includes the position information of the initial time point of the pilots in the respective sub-frames.

In one embodiment, the initial time point in each sub-frame is particularly the first symbol of each sub-frame.

In one embodiment, the processor 500 is further configured:

to update the pilot pattern of the user equipment so that the time-frequency position information of the pilots in the updated pilot pattern includes position information of the initial time point of the pilots in the sub-frames, and subsequent time points to the initial time point; and to send the pilots to the user equipment in the updated pilot pattern through the transceiver 510.

In one embodiment, the processor 500 is further configured, after the first device updates the pilot pattern for the user equipment, and before the pilots are sent to the user equipment in the updated pilot pattern through the transceiver 510, to send control information to the user equipment through the transceiver 510 to instruct the user equipment to receive the pilots.

In one embodiment, the control information includes indication information of the updated pilot pattern.

In one embodiment the processor 500 is configured to update the pilot pattern for the user equipment according to a coherence period of time and a coherence bandwidth of a user channel.

The transceiver 510 is configured to transmit and receive data under the control of the processor 500.

Here in FIG. 11, the bus architecture can include any number of interconnecting buses and bridges to particularly link together various circuits including one or more processors represented by the processor 500, and one or more memories represented by the memory 520. The bus architecture can further link together various other circuits, e.g., a peripheral device, a manostat, a power management circuit, etc., all of which are well known in the art, so a further description thereof will be omitted in this context. The bus interface serves as an interface. The transceiver 510 can be a number of elements, e.g., a transmitter and a receiver, which are devices for communication with various other devices over a transmission medium. The processor 500 is responsible for managing the bus architecture and performing normal processes, and the memory 520 can store data for use by the processor 500 in performing the operations.

The processor 500 can be a Central Processing Unit (CPU), an Application-Specific Integrated Circuit (ASIC), a Field-Programmable Gate Array (FPGA), or a Complex Programmable Logic Device (CPLD).

Figure 12:
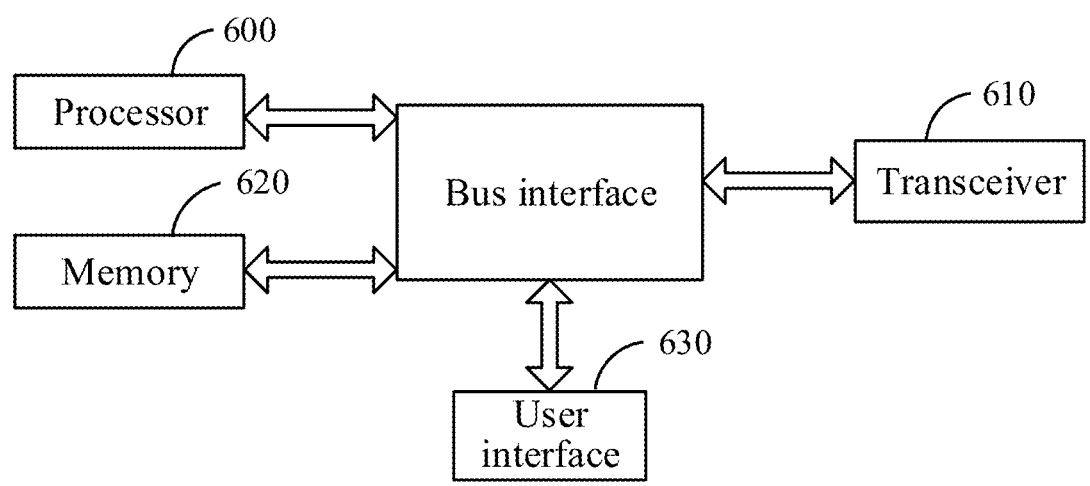
FIG. 12 is a schematic structural diagram of another apparatus for receiving a pilot according to an embodiment of the disclosure.

As illustrated in FIG. 12, an embodiment of the disclosure provides another apparatus for receiving a pilot at the user equipment side, where the apparatus includes:

a processor 600 is configured to read and execute program in the memory 620:

to receive a pilot at an initial time point in a sub-frame through a transceiver 610; and to determine channel estimation of the sub-frame using the pilot.

In one embodiment the processor 600 is further configured:

to receive control information to instruct the user equipment to receive pilots through the transceiver 610; and to receive the pilots at the initial time point and its subsequent time points in the sub-frame according to the control information through the transceiver 610.

The transceiver 610 is configured to transmit and receive data under the control of the processor 600.

Here in FIG. 12, the bus architecture can include any number of interconnecting buses and bridges to particularly link together various circuits including one or more processors represented by the processor 600, and one or more memories represented by the memory 620. The bus architecture can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are devices for communication with various other devices over a transmission medium. For different user equipments, the user interface 630 can also be an interface via which devices are connected internally and externally as needed, and the connected devices include but will not be limited to a keypad, a monitor, a speaker, a microphone, a joystick, etc.

The processor 600 is responsible for managing the bus architecture and performing normal processes, and the memory 620 can store data for use by the processor 600 in performing the operations.

The processor 600 can be a Central Processing Unit (CPU), an Application-Specific Integrated Circuit (ASIC), a Field-Programmable Gate Array (FPGA), or a Complex Programmable Logic Device (CPLD).

In summary, in the embodiments of the disclosure, the prepositive pilots are arranged so that the receiver can obtain a channel estimation value earlier to thereby shorten a period of time for waiting, so as to shorten a delay in uni-direction in a URLLC scenario; and dynamic pilots can be sent dynamically as instructed in a control channel to thereby select different pilot patterns for different services so as to make a pilot overhead lie in a reasonable range.

Embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

What is claimed is:

1. A method for sending a pilot, comprising:
    determining a pilot pattern configured for a user equipment, wherein the pilot pattern comprises time-frequency position information of the pilot, and the time-frequency position information of the pilot comprises position information of an initial time point of the pilot in sub-frames;
    sending the pilot to the user equipment according to the pilot pattern, wherein a pilot symbol is set at an initial time point of each of the sub-frames;
    updating the pilot pattern of the user equipment so that time-frequency position information of the pilot in the updated pilot pattern comprises position information of the initial time point of the pilot in the sub-frames, and position information of the subsequent time points after the initial time point; and
    sending the pilot to the user equipment according to the updated pilot pattern;
    wherein the method further comprises: after the pilot pattern is updated for the user equipment, and before the pilot is sent to the user equipment according to the updated pilot pattern;
    sending control information to the user equipment to instruct the user equipment to receive the pilot, wherein the control information comprises indication information of the updated pilot pattern.

2. The method according to claim 1, wherein the time-frequency position information of the pilot comprises position information of the initial time point of the pilot in each of the sub-frames.

3. The method according to claim 2, wherein the initial time point in each of the sub-frames is a first symbol of each of the sub-frames.

4. The method according to claim 1, wherein updating the pilot pattern for the user equipment comprises: updating the pilot pattern for the user equipment according to a coherence period of time and a coherence bandwidth of a user channel.

5. A method for receiving a pilot, comprising:
    receiving a pilot at an initial time point in a sub-frame of subframes; wherein a pilot symbol is set at an initial time point of each of the sub-frames;
    determining channel estimation of the sub-frame using the pilot;
    receiving control information to instruct the user equipment to receive the pilot, wherein the control information comprises indication information of the updated pilot pattern; and
    receiving the pilot at an initial time point and subsequent time points after the initial time point in the sub-frame according to the control information;
    wherein the control information is sent after the pilot pattern is updated for the user equipment, and before the pilot is sent to the user equipment according to the updated pilot pattern; and time-frequency position information of the pilot in the updated pilot pattern comprises position information of the initial time point of the pilot in the sub-frames, and position information of the subsequent time points after the initial time point.

6. An apparatus for sending a pilot, comprising a memory configured to store a computer readable program and a processor configured to execute the computer readable program to:
    determine a pilot pattern configured for a user equipment, wherein the pilot pattern comprises time-frequency position information of pilot, and the time-frequency position information of the pilot comprises position information of an initial time point of the pilot in sub-frames;
    send the pilot to the user equipment according to the pilot pattern, wherein a pilot symbol is set at an initial time point of each of the sub-frames;
    update the pilot pattern of the user equipment so that time-frequency position information of the pilot in the updated pilot pattern comprises position information of the initial time point of the pilot in the sub-frames, and position information of the subsequent time points after the initial time point; and
    send the pilot to the user equipment in the updated pilot pattern;
    wherein the processor is further configured to execute the computer readable program to, after the first unit updates the pilot pattern for the user equipment, and before the pilot is sent to the user equipment according to the updated pilot pattern, send control information to the user equipment to instruct the user equipment to receive the pilot, wherein the control information comprises indication information of the updated pilot pattern.

7. The apparatus according to claim 6, wherein the time-frequency position information of the pilot comprises position information of the initial time point of the pilot in each of the sub-frames.

8. The apparatus according to claim 7, wherein the initial time point in each of the sub-frames is a first symbol of each of the sub-frames.

9. The apparatus according to claim 6, wherein the processor is configured to execute the computer readable program to update the pilot pattern for the user equipment according to a coherence period of time and a coherence bandwidth of a user channel.

10. An apparatus for receiving a pilot, comprising a memory configured to store a computer readable program and a processor configured to execute the computer readable program to:

receive a pilot at an initial time point in a sub-frame of subframes; wherein a pilot symbol is set at an initial time point of each of the sub-frames;

determine channel estimation of the sub-frame using the pilot;

receive control information to instruct the user equipment to receive the pilot, wherein the control information comprises indication information of the updated pilot pattern; and receive the pilot at an initial time point and subsequent time points after the initial time point in the sub-frame according to the control information, wherein the control information is sent after the pilot pattern is updated for the user equipment, and before the pilot is sent to the user equipment according to the updated pilot pattern; and time-frequency position information of the pilot in the updated pilot pattern comprises position information of the initial time point of the pilot in the sub-frames, and position information of the subsequent time points after the initial time point.

* * * * *